United States Patent
Critchley et al.

(10) Patent No.: US 9,463,821 B1
(45) Date of Patent: Oct. 11, 2016

(54) CARRIED AWAY/PRINCESS CARRIAGE STROLLER ATTACHMENT

(71) Applicants: Sharlene R. Critchley, San Antonio, TX (US); Mary M. Keene, San Antonio, TX (US); Ashley K. Critchley, San Antonio, TX (US)

(72) Inventors: Sharlene R. Critchley, San Antonio, TX (US); Mary M. Keene, San Antonio, TX (US); Ashley K. Critchley, San Antonio, TX (US)

( * ) Notice: Subject to any disclaimer, the term of this patent is extended or adjusted under 35 U.S.C. 154(b) by 0 days.

(21) Appl. No.: 15/130,755

(22) Filed: Apr. 15, 2016

Related U.S. Application Data

(60) Provisional application No. 62/149,235, filed on Apr. 17, 2015.

(51) Int. Cl.
*B62B 9/10* (2006.01)
*B62B 9/14* (2006.01)

(52) U.S. Cl.
CPC ... *B62B 9/10* (2013.01); *B62B 9/14* (2013.01)

(58) Field of Classification Search
None
See application file for complete search history.

(56) References Cited

U.S. PATENT DOCUMENTS

| | | | | |
|---|---|---|---|---|
| 2,789,863 A * | 4/1957 | Shimabukuro | ......... | B62B 9/142 135/115 |
| 3,227,484 A * | 1/1966 | Merclean | ......... | B62B 9/142 296/77.1 |
| 3,834,756 A * | 9/1974 | Grell | ......... | B62B 9/142 296/136.1 |
| 4,098,536 A * | 7/1978 | Mills | ......... | B60J 11/00 135/117 |
| 4,533,170 A * | 8/1985 | Banks | ......... | B62B 9/142 135/88.01 |
| 4,582,355 A * | 4/1986 | Hall | ......... | B62B 9/142 296/77.1 |
| 5,184,865 A * | 2/1993 | Mohtasham | ......... | B62B 9/142 135/133 |
| 5,460,395 A * | 10/1995 | Chen | ......... | B62B 7/12 280/204 |
| 5,975,558 A * | 11/1999 | Sittu | ......... | B62B 9/142 280/47.38 |
| 5,975,613 A * | 11/1999 | Sippel | ......... | B62B 9/145 296/77.1 |
| 6,012,184 A * | 1/2000 | Childers | ......... | A47D 15/00 5/416 |
| D424,483 S * | 5/2000 | Tripodi | ......... | D12/129 |
| 6,217,099 B1 * | 4/2001 | McKinney | ......... | B62B 9/142 160/89 |
| 6,224,073 B1 * | 5/2001 | Au | ......... | B62B 9/142 280/47.38 |
| 6,296,004 B1 * | 10/2001 | Gordon | ......... | B62B 9/14 135/115 |
| 7,213,878 B2 * | 5/2007 | Delapaz | ......... | B62B 9/142 297/184.1 |
| 7,354,049 B2 * | 4/2008 | Schmidt | ......... | A45C 9/00 280/33.993 |
| D619,939 S * | 7/2010 | Olsen | ......... | D12/133 |
| 8,550,548 B2 * | 10/2013 | Gibbons | ......... | A47D 13/02 297/184.13 |
| 2003/0111102 A1 * | 6/2003 | Henley | ......... | A45B 19/00 135/125 |
| 2004/0129306 A1 * | 7/2004 | Jefferson | ......... | B62B 9/142 135/96 |
| 2006/0181121 A1 * | 8/2006 | Delapaz | ......... | B62B 9/142 297/219.12 |
| 2015/0183352 A1 * | 7/2015 | Bowe | ......... | A47D 15/00 297/184.11 |

* cited by examiner

Primary Examiner — Erez Gurari
(74) Attorney, Agent, or Firm — Gunn, Lee & Cave, P.C.

(57) ABSTRACT

A removable, collapsible, enclosure is shown that may be attached to a stroller at the wheels and handles. The removable enclosure may be detached from the stroller, cross-bracing collapsed, and folded into a small package. When expanded the enclosure can attach to the stroller and provide an enclosed carriage for the baby/child in the stroller.

8 Claims, 7 Drawing Sheets

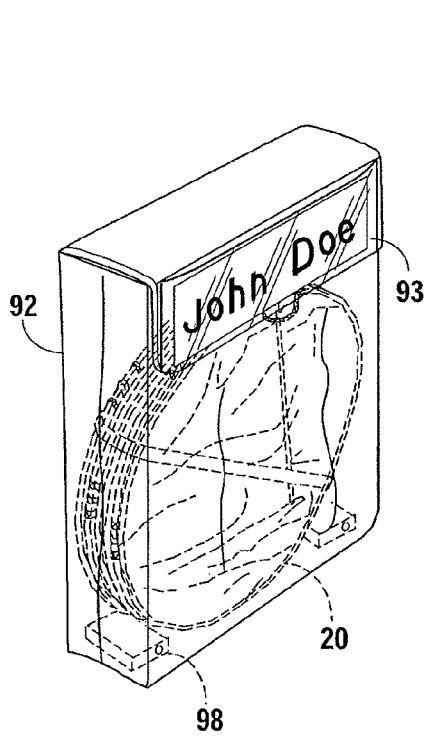
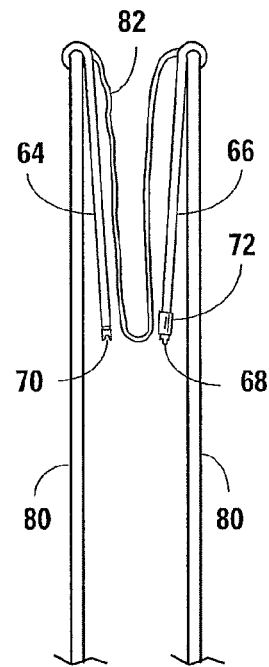
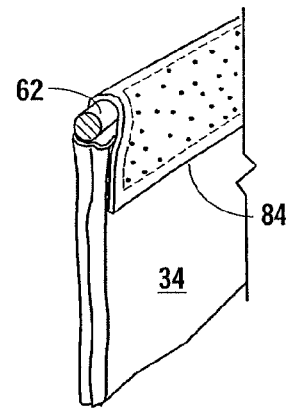
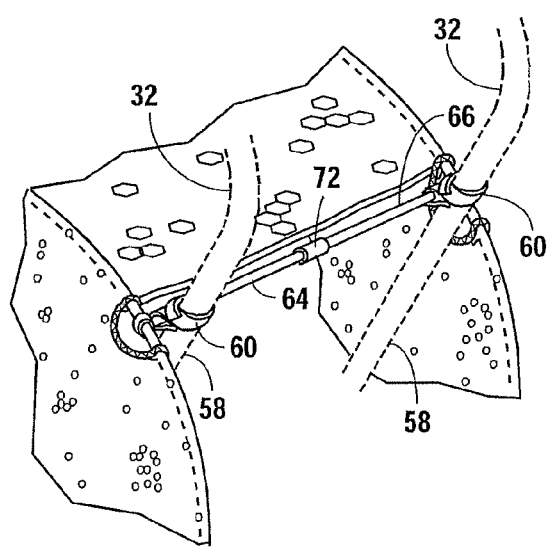
Fig. 4
Fig. 5
Fig. 7
Fig. 6

US 9,463,821 B1

CARRIED AWAY/PRINCESS CARRIAGE STROLLER ATTACHMENT

CROSS REFERENCE TO RELATED APPLICATIONS

This is a utility patent application claiming priority to U.S. Provisional Application Patent No. 62/149,235, filed Apr. 17, 2015.

BACKGROUND OF THE INVENTION

1. Field of the Invention

The present invention relates to baby/child strollers, and, more particularly, to a baby/child stroller that has a removable, pop-up cover that can convert the baby/child stroller into a prince/princess carriage.

2. Description of the Prior Art

Baby/child strollers have been used for a long time. Probably the most common frame for a baby/kid carriage is shown in U.S. Pat. No. 8,733,758 to Wang, entitled "Baby Carriage," which is incorporated by reference. The baby carriage of Wang has a foldable frame 1. If the foldable frame is fully extended, a seat may then be located within the frame. The child may then ride in the seat as contained within the foldable frame.

Also in the past, baby strollers have had some type of canopy or cover to keep the sun out of the eyes of the child. Such a canopy or cover is shown in FIGS. 1, 2 and 3 of U.S. Pat. No. 8,596,669 to Liao, which is incorporated by reference.

For children that are old enough to walk but many times ride in a stroller, the child may get bored when riding in the stroller. The present invention is directed towards taking an ordinary stroller and converting it into something that would be fun for the child.

SUMMARY OF THE INVENTION

It is an object of the present invention to provide a removable enclosure for a stroller.

It is another object of the present invention to provide a removable cover for a stroller, which cover can convert the stroller into an enclosed carriage.

It is still another object of the present invention to take an ordinary stroller and convert it into a prince/princess carriage with a pop-up, easily attachable, enclosure that fits over the seating area of the stroller.

A generally circular enclosure that has memory wire in the outer edge thereof provides an enclosed space approximately the width of the stroller. The enclosed space is attached to the stroller at the wheels and the handles. Memory wire providing the flexible support for the enclosure.

Windows are provided in the side of the enclosure so that the baby/child can see out. The entrance for the enclosure is provided in front thereof, which entrance can be open or closed. The enclosure can have all types of decorative designs printed thereon. The design could be reflective or made of any other desired artistic feature. Lights can be provided on the enclosure with the use of a battery pack. The objective is to have an enclosure that the baby/child will enjoy riding in because it is their prince/princess carriage.

DESCRIPTION OF THE DRAWINGS

FIG. 4 is a perspective view illustrating the enclosure being stored during periods of non-use.

FIG. 5 illustrates the enclosure being collapsed.

FIG. 6 is a partial perspective view illustrating the attachment of the enclosure to the handles of the stroller.

FIG. 7 is a partial sectional perspective view of the connection of the door to the enclosure.

DESCRIPTION OF THE PREFERRED EMBODIMENT

Figure 1:
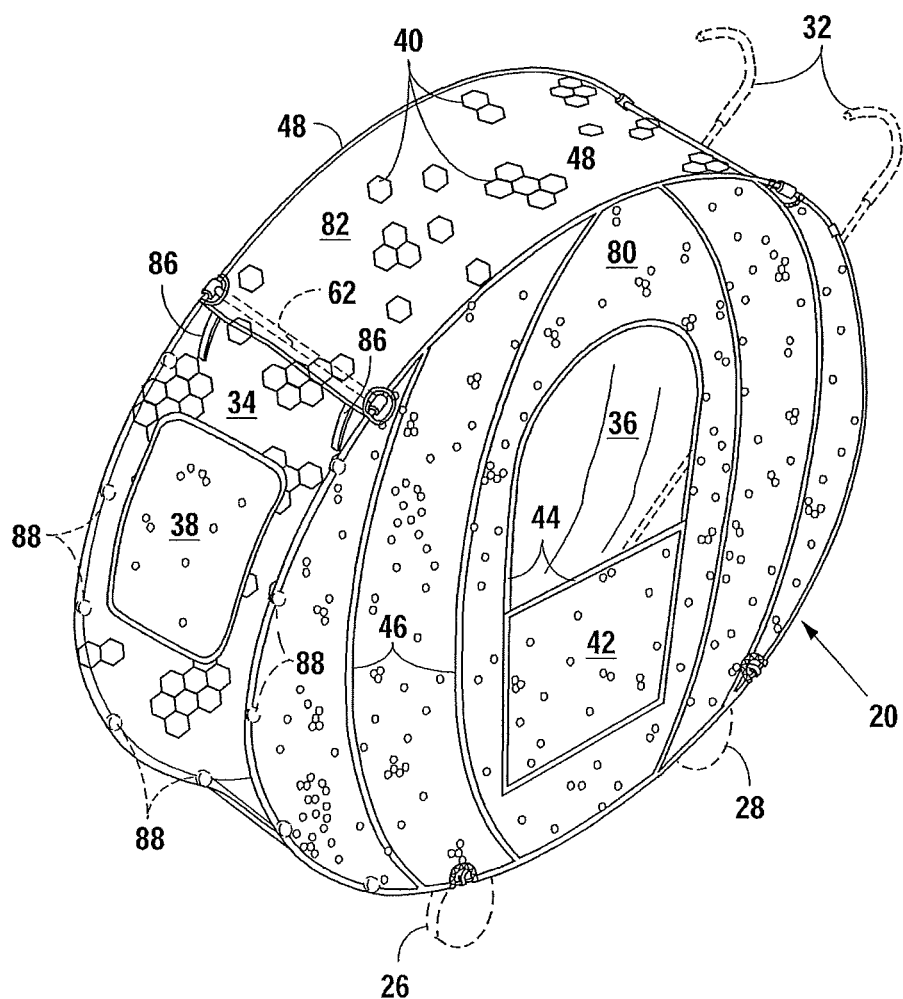
FIG. 1 is a perspective view of the present invention.
Figure 2:
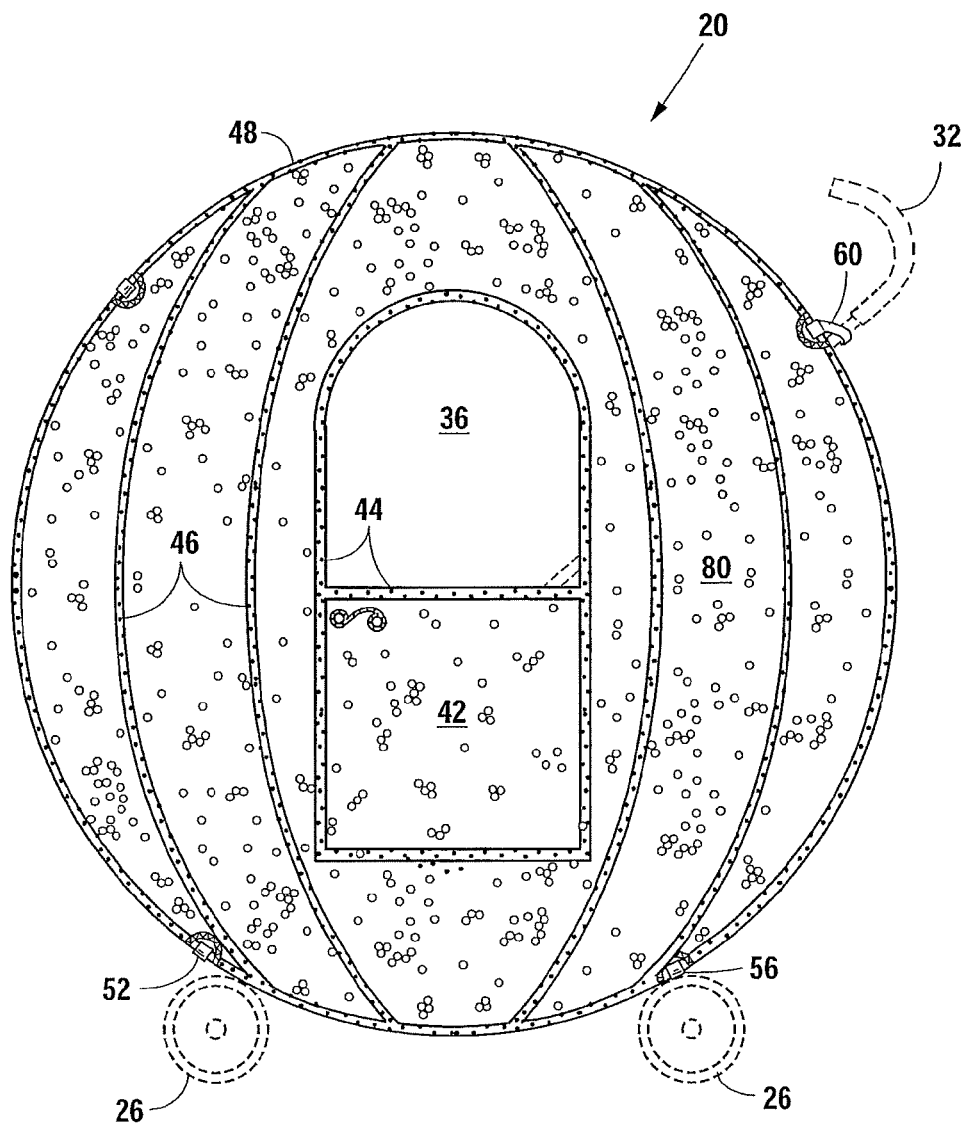
FIG. 2 is a side view of the present invention.
Figure 3:
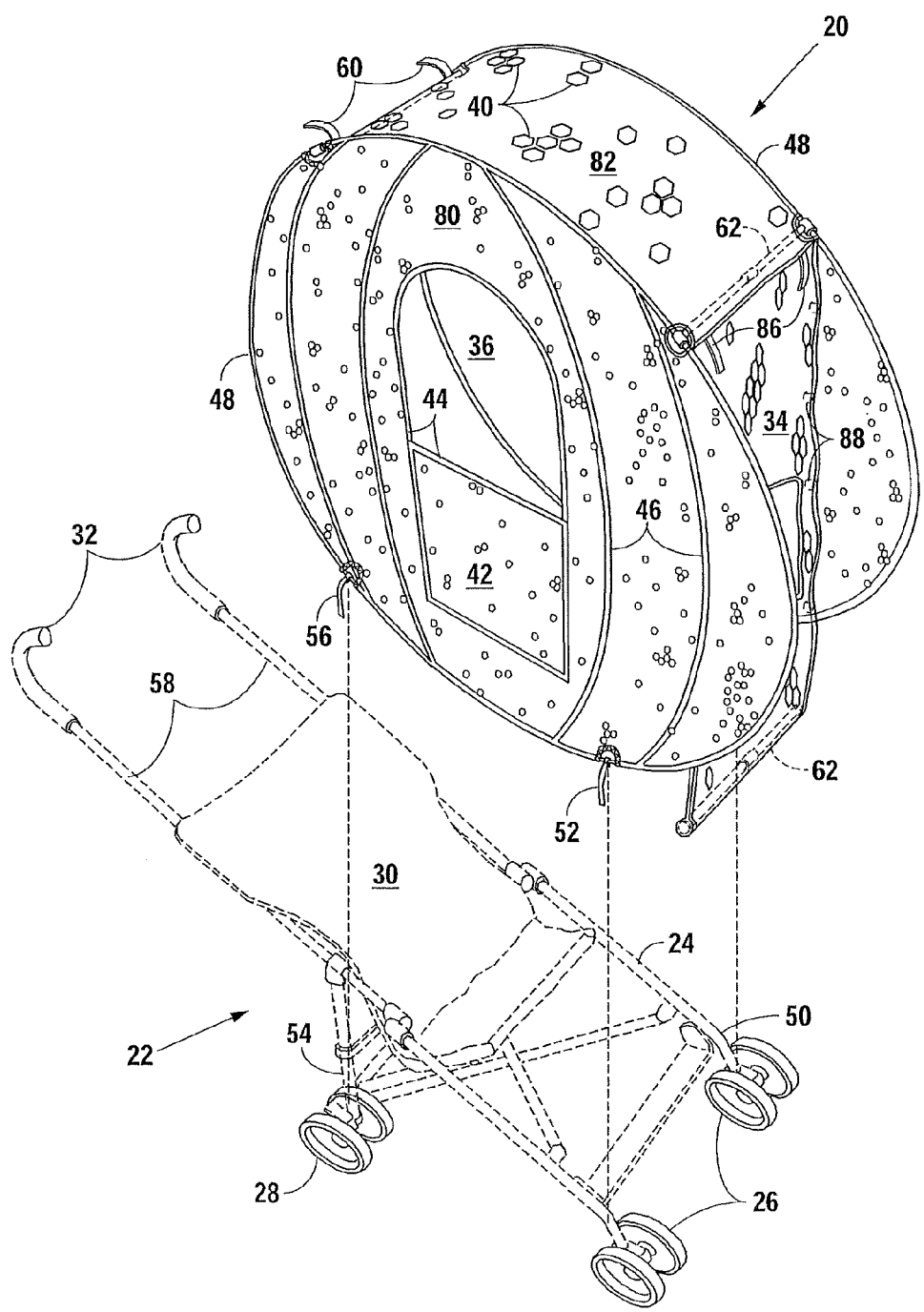
FIG. 3 is an exploded perspective view showing the enclosure prior to attachment to a stroller.
Figure 8:
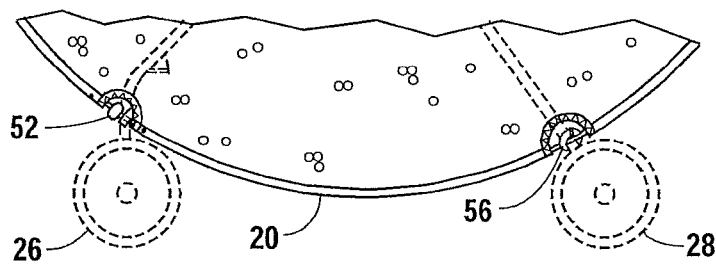
FIG. 8 is an enlarged bottom vertical view illustrating connection of the enclosure to the stroller.

Referring to FIGS. 1, 2 and 3 in combination, an enclosure 20 is attached to a stroller 22. The stroller 22 is a typical stroller with a collapsible frame 24. The collapsible frame has front wheels 26, rear wheels 28 and a flexible seat 30 mounted inside of the collapsible frame 24. Handles 32 extend upward so that an individual can push the stroller 22.

The enclosure 20 has a flexible door 34 on the front thereof. The flexible door 34 may be opened and a child placed in the flexible seat 30 of the stroller 22.

While the enclosure may be of any particular design, Applicants envision the enclosure 24 would have open side windows 36 and a front window 38 made out of a flexible clear plastic so that a child sitting in the stroller 22 can see out of the enclosure 20.

While any particular design may be created on the enclosure 20, the design as shown in FIGS. 1-3 consist of reflective patches 40 scattered over the surface of the enclosure 20. The material used to create the enclosure 20 may be a mesh type fabric that is breathable to make the inside of the enclosure 20 as cool as possible. A fake door 42 may be included in each side of the enclosure 20 by use of door seams 44. Rib seams 46 may extend down the sides of the enclosure 20 to make it resemble a carriage of a fairy princess or prince. Edge seams 48 extend around the outer corners of the enclosure 20.

The enclosure 20 is attached at the lower front thereof to the front wheel support 50 by front Velcro® straps 52. The lower rear of the enclosure 20 is attached to rear wheel supports 54 by rear Velcro® straps 56. The upper rear of the enclosure 20 is attached to handle supports 58 by means of handle Velcro® straps 60.

At the top of the flexible door 34 is located a collapsible cross-brace 62 as will be described in conjunction with FIGS. 11A and 11B. The collapsible cross-brace 62 has a left-half 64 and a right-half 66 that are connected together by ball 68 and socket 70. The ball 68 and socket 70 are held together with lateral support being provided by sleeve 72. Sleeve 72 has a circumferential ring 74 therein, which circumferential ring mates with either of the notches 76, depending upon whether the left half 64 and right half 66 are connected or disconnected.

Figure 9:
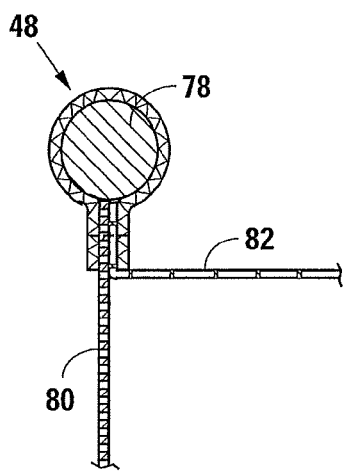
FIG. 9 is a cross-sectional view of one corner edge of the enclosure containing memory wire.

Within the edge seams 48 is contained memory wire 78 similar to the memory wire contained in the outer edge of a windshield shade. A cross-sectional view of one of the edges of the enclosure 20 is shown in FIG. 9 to show the edge seam 48 with the memory wire 78 contained therein. Extended downward from the edge seam 48 is the outside wall 80 of the enclosure 20. Extending horizontally is the circular wall 82 of the enclosure 20. The outside wall 80 is sewed to the circular wall 82, thereby enclosing the memory wire 78 within the edge seam 48.

Figure 11A:
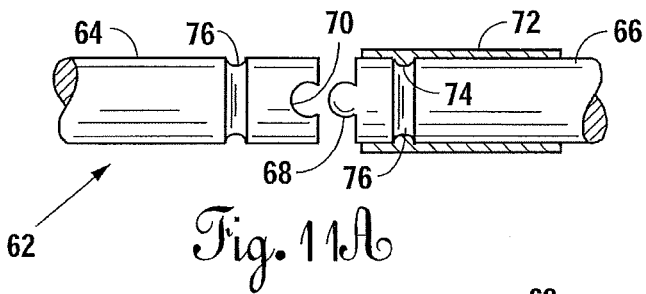
FIGS. 11A and 11B are sequential side views of the cross-brace for the enclosure.
Figure 11B:
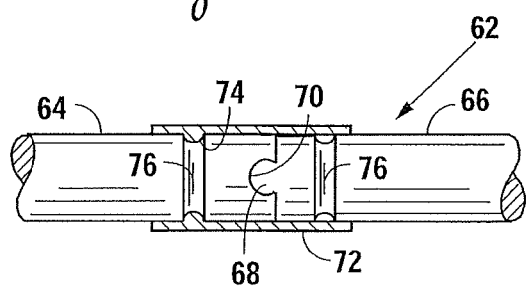

To maintain a constant space between the two outside walls 80, the left half 64 is connected to the right half 66 and the sleeve 72 is slid into place (see FIGS. 6, 11A and 11B). In that manner, the collapsible cross-brace 62 will provide cross-support between the handle supports 58 and at the upper front of the enclosure 20.

Just as the collapsible cross-brace 62 provides support between the handle supports 58, another collapsible cross-brace 62 is contained within the enclosure 20 at the top of the flexible door 34. In FIG. 7, the top of the flexible door 34 is shown connected to the collapsible cross-brace 62. An upper flap 84 of the flexible door 34 encircles the collapsible cross-brace 62 and is sewed to the circular wall 82.

If the occupant of the enclosure 20 wants more of a viewing area, the flexible door 34 may be rolled up and tied into place with the flexible door straps 86. When the flexible door 34 is closed, magnets sewed into the edge of the flexible door 34 will attach either to the memory wire 78 (if it is ferromagnetic), or to magnets contained in the outer edge of the outside wall 80 (see FIG. 1).

Just as a collapsible cross-brace 62 may be located at the top of the flexible door 34, another collapsible cross-brace 62 may be located in the bottom of the flexible door 34.

FIG. 5 illustrates the disconnection of the left half 64 from the right half 66 of the collapsible cross-braces 62 prior to moving the outside walls 80 together. The circular wall 82 collapses inside of the outside walls 80.

Figure 12:
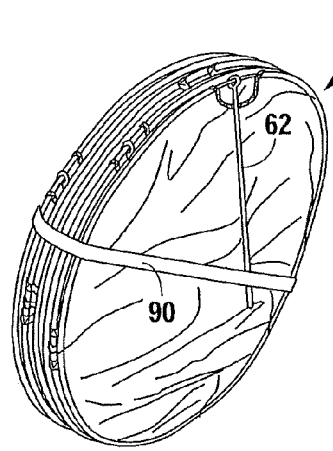
FIG. 12 is a perspective view of the enclosure as collapsed.

To fold the enclosure 20, remove the enclosure 20 from the stroller 22 and disconnect the left half and right half of the collapsible cross-brace 62. The outside walls 80 of the enclosure 20 may then be pushed together and twisted to make a small package in the same manner as a windshield shade on an automobile is collapsed. The collapsed enclosure 20 is illustrated in FIG. 12. An elastic band 90 may be used to hold the collapsed enclosure 20 together. The collapsed enclosure 20 may be carried in a flexible container 92 as illustrated in FIG. 4. The name of the person riding in the enclosure 20 is visible through the clear plastic flap 93.

Figure 10:
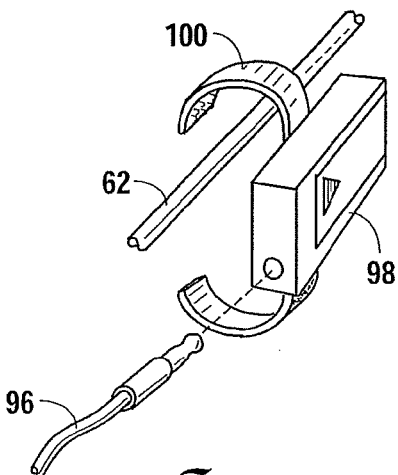
FIG. 10 is a partial perspective view illustrating connection of a battery pack on the stroller.
Figure 14:
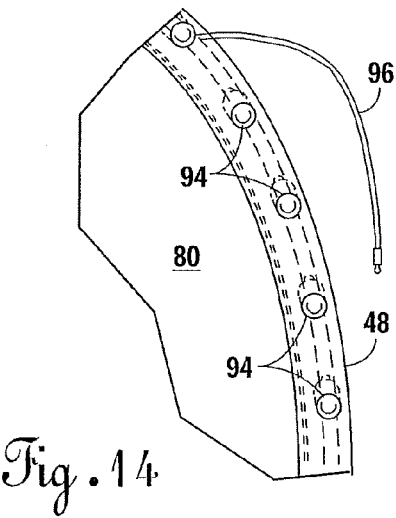
FIG. 14 is an enlarged partial view illustrating the lighting.
Figure 13:
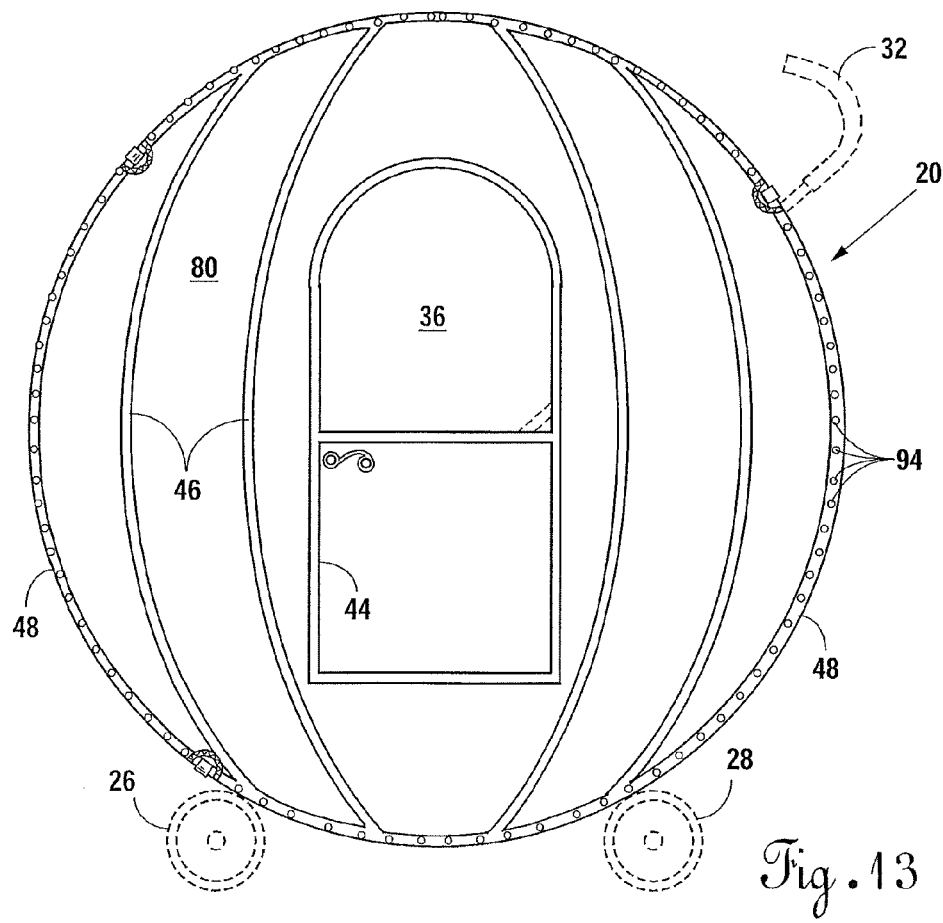
FIG. 13 is an elevated side view showing lighting for the enclosure.

An additional feature is that the enclosure may have miniature low-wattage lights 94 there around (see FIGS. 13 and 14). While the miniature low-wattage lights 94 are shown on the edge seams 48, the miniature low-wattage lights 94 could be anywhere on the enclosure 20. A power cord 96 will connect the miniature low-wattage lights 94 to a battery pack 98 (see FIGS. 10 and 14). The battery pack 98 may be connected by battery pack Velcro® strap 100 to any of the collapsible cross-braces 62. When not in use, the battery pack 98 may be carried in the bottom of the flexible container 92 as illustrated in FIG. 4.

Instead of low voltage lights 94, glow-in-the-dark paints can be used on the enclosure 20. The glow-in-the-dark paint can be used to form different decorative designs such as a race car, princess carriage, spaceship, etc.

It is understood that the design of the enclosure 20 may vary with different design patterns being shown on the outside of the enclosure 20. For example, the enclosure 20 could be made to resemble a princess carriage in one embodiment, or a race car in another embodiment. The configuration of the lights, reflection patterns and the door may all be varied.

Figure 15:
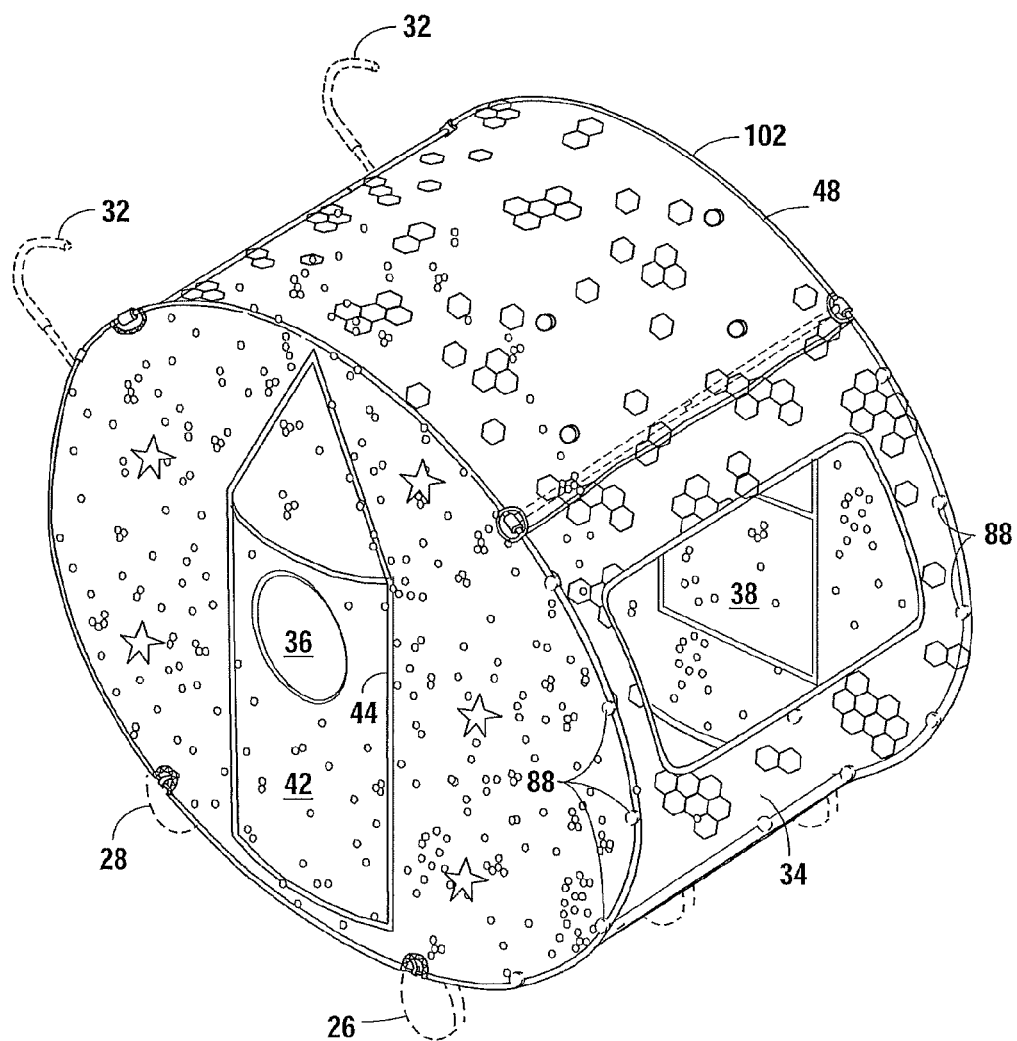
FIG. 15 is a perspective view of a twin enclosed stroller.

Just as there are strollers for twins, there can also be a twin enclosure 102 as is illustrated in FIG. 15. Patterns on the twin enclosure 102 (shown in FIG. 15) can vary the same as the patterns for the enclosure 20 illustrated in FIGS. 1-14. Each side of the twin enclosure 102 may have a different decorative design. For example, one side could be a race car and the other side a princess carriage.

So that each person using the carriage can tell their carriage from someone else's carriage of a similar design, a pocket may be provided in the flexible door 34 where the user can insert their name. The name of the person using the carriage can be inserted in clear plastic slots at any desired location on the enclosure 20.

What we claim is:

1. A removable enclosure for attaching to a stroller for a baby, the stroller having a frame with front wheels, rear wheels and handles spread apart a predetermined distance with a flexible seat suspended there between, the frame including front wheel support and rear wheel support, the removable enclosure comprising:
   a flexible left wall, a flexible right wall and a flexible circular wall there between;
   left edge seams between said flexible circular wall and said flexible left wall;
   right edge seam between said flexible circular wall and said flexible right wall;
   a left memory wire inserted in said left edge seam;
   a right memory wire inserted in said right edge seam;
   collapsible cross braces attaching between said left memory wire and said right memory wire to maintain said predetermined distance between said flexible left wall and said flexible right wall;
   a lower opening in said flexible circular wall to receive said stroller therein;
   front wheel strips for attaching a lower front of said left and right memory wire to said front wheel supports;
   rear wheel straps for attaching a lower rear of said left and right memory wire to said rear wheel supports;
   handle straps for attaching an upper rear of said left and right memory wire to said handles;
   a door in said flexible circular wall to allow access to said flexible seat;
   windows in said flexible left wall and said flexible right wall so that the baby can see out when located in said flexible seat;
   upon disconnecting said front wheel straps, said rear wheel straps and said handle straps, said removable enclosure is detached from said frame and may be folded together upon collapsing said collapsible cross braces.

2. The removable enclosure for attaching to a stroller for a baby as recited in claim 1 wherein said flexible left wall, said flexible right wall and said flexible circular wall are decorated.

3. The removable enclosure for attaching to a stroller for a baby as recited in claim 2 wherein said door may be rolled up and tied in place by door straps.

4. The removable enclosure for attaching to a stroller for a baby as recited in as recited in claim 3 wherein said collapsible cross braces snap together with a ball and socket and a sleeve slideable there over.

5. The removable enclosure for attaching to a stroller for a baby as recited in claim 4 wherein said flexible left wall and said flexible right wall have fake doors thereon with windows therein.

6. The removable enclosure for attaching to a stroller for a baby as recited in claim 5 further includes lights attached to said removable enclosure, said lights being connectable to a portable battery pack.

7. The removable enclosure for attaching to a stroller for a baby as recited in claim 6 wherein upon disconnecting and collapsing said collapsible cross braces, said removable enclosure is foldable.

8. The removable enclosure for attaching to a stroller for a baby as recited in claim 7 wherein said removable container has a name thereon.

* * * * *